United States Patent [19]
Bandai

[11] Patent Number: 4,706,213
[45] Date of Patent: Nov. 10, 1987

[54] GRAPHIC MEMORY SYSTEM FOR INTERAREA TRANSFER OF X-Y COORDINATE DATA

[75] Inventor: Yoshiaki Bandai, Tokyo, Japan

[73] Assignee: Kabushiki Kaisha Toshiba, Kawasaki, Japan

[21] Appl. No.: 655,158

[22] Filed: Sep. 27, 1984

[30] Foreign Application Priority Data

Sep. 30, 1983 [JP] Japan ................................ 58-182638

[51] Int. Cl.[4] .......................... G06F 13/06; G06F 7/00
[52] U.S. Cl. ...................................... 364/900; 340/724
[58] Field of Search ... 364/200 MS File, 900 MS File; 340/724, 747, 749, 750

[56] References Cited

U.S. PATENT DOCUMENTS 4,511,962 4/1985 Machida et al. ..................... 364/200
4,545,014 10/1985 Oguchi ................................ 364/200
4,555,775 11/1985 Pike ..................................... 364/900

FOREIGN PATENT DOCUMENTS 50-99586 8/1975 Japan .

OTHER PUBLICATIONS

"Alto: A Personal Computer", Thacker et al., in *Computer Structures: Principles & Design*, Siewiorek, Bell and Newell, McGraw-Hill, 1982.

*Primary Examiner*—Archie E. Williams, Jr.
*Assistant Examiner*—Michael J. Ure
*Attorney, Agent, or Firm*—Cushman, Darby & Cushman

[57] ABSTRACT

A system has circuitry for reading out a graphic data string from a source area of a graphic memory, starting from a start address storing the graphic data string, by continuously counting the start address of the graphic memory. The graphic data string read out by this circuitry is stored in a buffer memory. When storage of the graphic data string in the buffer memory is completed, the graphic data string is continuously read out from the buffer memory. The readout graphic data string is written in a destination area, starting from a start address thereof, by continuously counting the start address of the destination area in the graphic memory.

8 Claims, 35 Drawing Figures

GRAPHIC MEMORY SYSTEM FOR INTERAREA TRANSFER OF X-Y COORDINATE DATA

BACKGROUND OF THE INVENTION

The present invention relates to a graphic display apparatus having a graphic memory and, more particularly, to a graphic memory interarea data transfer system for copying data at one area of a graphic memory into another area in the memory.

A graphic display apparatus of the type described above generally has a CRT monitor 11 for graphic display, a graphic memory (GM) 12 for storing graphic data (i.e., pattern data) to be displayed on the CRT monitor 11, a microprocessor ($\mu$P) 13 for controlling the overall apparatus, and a graphic control unit (GCU) 14, as shown in FIG. 1. The GCU 14 serves as an interface between the GM 12 and the $\mu$P 13. The GCU 14 has a CRT controller (not shown) for performing display control for the CRT monitor 11. The GCU 14 also has an X address counter 15 and a Y address counter 16 for performing a read/write operation of graphic data for itself. The X and Y address counters 15 and 16 count an X coordinate (X coordinate address) and a Y coordinate (Y coordinate address) on a display screen of the CRT monitor 11. An address of the GM 12 is designated by linked information of these X and Y coordinate addresses.

In a graphic display apparatus of this type, as shown in FIG. 2, in order to shift a screen portion, it is sometimes desired to copy or move n continuous display data at, for example, coordinates (XO, YO), (XO+1, YO), . . . and (XO', YO) (where XO'=X+n−1) of the screen of the CRT monitor 11 to a region defined by coordinates (X1, Y1), (X1+1, Y1), . . . and (X1', Y1) (where X1'=X1+n−1). In such cases, the $\mu$P 13 first sets the coordinates XO and YO in the X and Y address counters 15 and 16 and generates a read request of the GM 12 to the GCU 14. Then, the GCU 14 transfers the contents XO and YO of the X and Y address counters 15 and 16 to the GM 12, thereby requesting data read. As a result, graphic data corresponding to the coordinates XO and YO is read from the GM 12 to the GCU 14. The GCU 14 transfers the graphic data from the GM 12 to the $\mu$P 13. Subsequently, the $\mu$P 13 sets copy destination coordinates (addresses) X1 and Y1 in the X and Y address counters 15 and 16 of the GCU 14. While the $\mu$P 13 transfers the received graphic data to the GCU 14, it supplies a write request of the GM 12 to the GCU 14. Then, the GCU 14 transfers the contents X1 and Y1 of the X and Y address counters 15 and 16 to the GM 12 and writes the above data (graphic data at the coordinates XO and YO) in the GM 12. In a similar manner, a read operation of graphic data at coordinates XO+1 and YO, a write operation of the readout data at coordinates X1+1 and Y1, . . . , a read operation of graphic data at coordinates XO' and YO, and a write operation of the readout data at coordinates X1' and Y1 are sequentially performed. In this manner, a designated copy operation is completed.

In conventional data transference in a graphic memory, the read/write operation of graphic data to be transferred is performed in a point-to-point manner. For this reason, the data transfer speed is limited by the speed of the $\mu$P, so that a high-speed data transfer cannot be performed.

SUMMARY OF THE INVENTION

It is an object of the present invention to provide a graphic memory interarea data transfer system which is capable of performing data transfer from one area of a graphic memory to another area therein.

In order to achieve the above object of the present invention, there is provided a graphic memory interarea data transfer system for a graphic display apparatus. The graphic display apparatus has a graphic memory for storing graphic data and transfers graphic data at a source area in the graphic memory, designated by an apparatus of higher performance, to a destination area therein and displays the graphic data. The graphic memory interarea data transfer system of the present invention includes:

an X coordinate address generator, responsive to an X start coordinate address supplied from the apparatus of higher performance, for continuously generating X coordinate addresses of the source or destination area of the graphic memory and supplying the X coordinate addresses to the graphic memory. A Y coordinate address generator, is responsive to a Y start coordinate address supplied from the apparatus of higher performance, for continuously generating Y coordinate addresses of the source or destination area of the graphic memory and supplying the Y coordinate addresses to the graphic memory. A buffer memory temporarily stores continuous graphic data read out from the graphic memory. A buffer memory address generator supplies continuous read or write addresses to the buffer memory. A first controller repeatedly reads out the graphic data from the graphic memory in accordance with the addresses of the source area, supplied from the X and Y coordinate address generators, and writes the readout graphic data in an address of the buffer memory, designated by the buffer memory address generator. A second controller repeatedly reads out the graphic data from an address of the buffer memory designated by the buffer memory address generator, and writes the readout graphic data at the addresses, supplied from the X and Y coordinate address generator, of the destination area of the graphic memory.

According to the present invention, a series of graphic memory interarea data transfer processing operations can be performed continuously and independently from an apparatus of higher performance. Therefore, high-speed graphic memory interarea data transfering and high-speed screen shifting can be performed. Furthermore, image rotation through 90 or 180 degrees can be performed at high speed in accordance with a mode bit, which indicates whether the read/write direction of a graphic data string from or in a graphic memory corresponds to the X or Y direction on the screen of a CRT monitor 21.

BRIEF DESCRIPTION OF THE DRAWINGS

Other objects and features of the present invention will be apparent from the following description taken in conjunction with the accompanied drawings, in which:

FIGS. 6A through 60 are timing charts in a read cycle in the graphic display apparatus having the system according to the present invention; and FIGS. 7A through 70 are timing charts in a write cycle in the graphic display apparatus having the system according to the present invention.

DETAILED DESCRIPTION OF THE PREFERRED EMBODIMENTS

Figure 3:
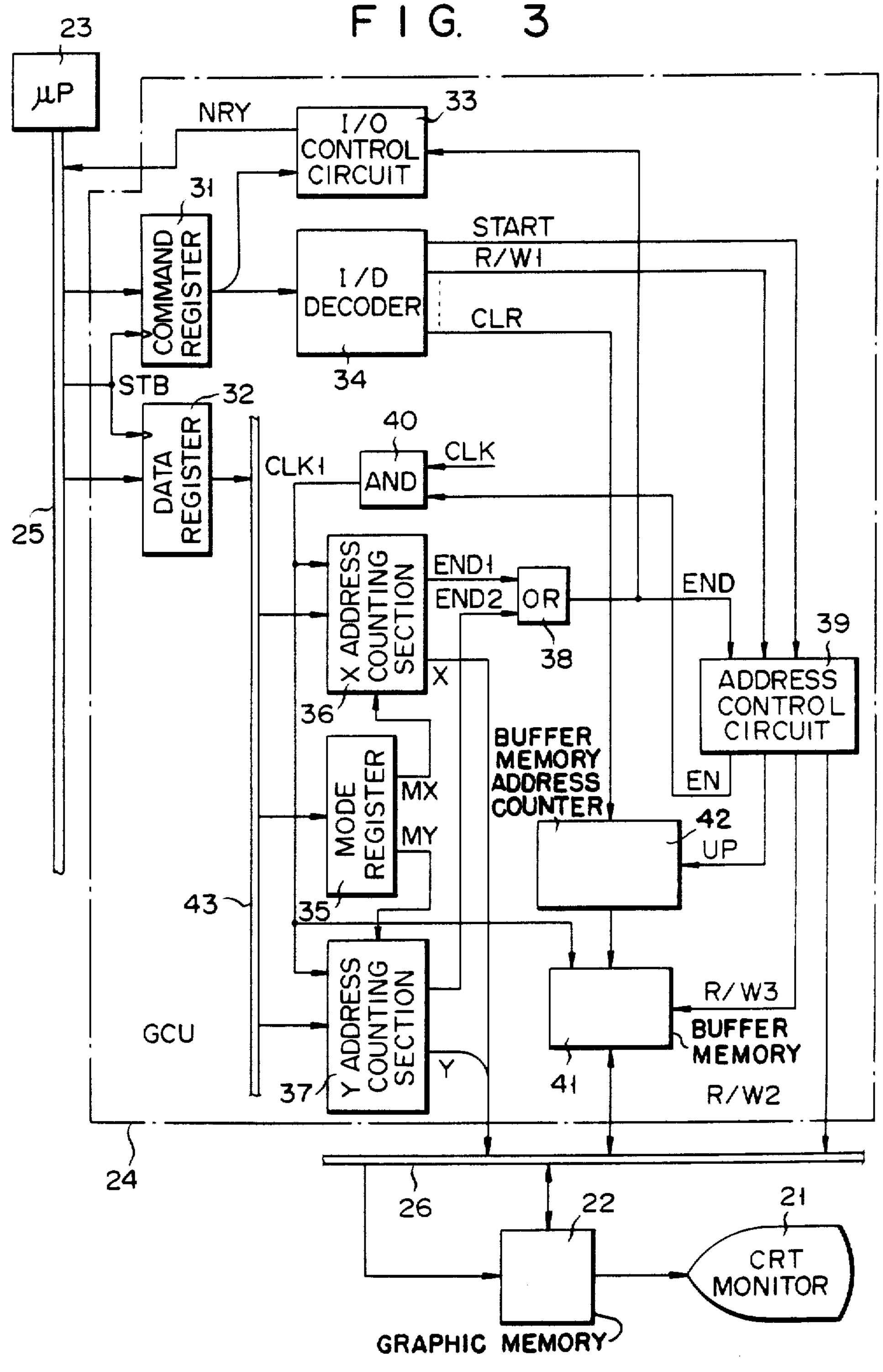
FIG. 3 is a block diagram showing the configuration of a graphic display apparatus adopting a graphic memory interarea data transfer system according to the present invention.

FIG. 3 is a block diagram showing the configuration of a graphic memory apparatus adopting a graphic memory interarea data transfer system according to the present invention. The graphic memory apparatus is an apparatus of higher performance (μP) 23 for controlling a CRT monitor 21, a graphic memory (GM) 22 and the overall apparatus and may comprise, for example, a microprocessor such as an 8086 available from Intel Inc., U.S.A. A graphic control unit (GCU) 24 serves as an interface between the GM 22 and the μP 23. The GCU 24 is connected to a microprocessor bus 25 of the μP 23.

In the GCU 24, a command register 31 and a data register 32 latch the command and data from the μP 23 in response to a strobe signal STB from the μP 23. An I/O control circuit 33 supplies a not ready signal NRY, representing a busy status, to the μP 23 in accordance with the contents of the command register 31 and an output from an OR gate 38. An I/O decoder 34 decodes the contents of the command register 31 and produces various control signals for controlling respective parts in the GCU 14 such as a start signal START for starting an address control circuit 39 to be described later, a read/write signal R/W1 for instructing the address control circuit 39 to begin a read/write operation with respect to the GM 22, or a clear signal CLR for clearing a BM address counter 42 to be described later.

A mode register 35 holds mode bits Mx and My. The mode bit Mx indicates that the read/write direction of the GM 22 corresponds to the X direction on the screen of the CRT monitor 21. Similarly, the mode bit My indicates that the read/write direction of the GM 22 corresponds to the Y direction on the screen of the CRT monitor 21. When the mode bit Mx is logic "O" and the mode bit My is logic "1", the transferred data is rotated through 90 degrees with respect to the same data before transference. When the mode bit Mx is logic "1" and the mode bit My is logic "O", if the transfer data is written in a destination area in the direction opposite to the read direction, the transferred data is rotated through 180 degrees with respect to the same data before transference.

An X address counting section 36 generates an X coordinate address X for the GM 22 in accordance with the mode bit Mx and a signal CLK1 to be described later. Similarly, a Y address counting section 37 generates a Y coordinate address Y for the GM 22 in accordance with the mode bit My and the signal CLK1. The X and Y address counting sections 36 and 37 detect the generation of a read/write address for the final data of a designated graphic data string and thereupon generate end signals END1 and END2.

The end signals END1 and END2, generated by the X and Y address counting sections 36 and 37, respectively, are ORed by the OR gate 38, which produces a signal END. In response to the start signal START and the read/write signal R/W1 from the I/O decoder 34 and the signal END from the OR gate 38, the address control circuit 39 generates various control signals for performing the address control of the GM 22 and a buffer memory (BM) 41 to be described later. These control signals include an enable signal EN for enabling the counting operation of the X and Y address counting sections 36 and 37, a read/write signal R/W2 for instructing a read/write operation of the GM 22, a read/write signal R/W3 for instructing a read/write operation of the BM 41 to be described later, and a count-up signal UP for incrementing the BM address counter 42. A clock signal CLK and the enable signal EN are ANDed by an AND gate 40, which produces the clock signal CLK1. The BM 41 temporarily stores a graphic data string read out from the GM 22. An address for accessing the BM 41 is generated by the BM address counter 42. The BM 41, the X address counting section 36, the Y address counting section 37, the address control circuit 39 and the like are connected to a GCU bus 26. The data register 32, the mode register 35, the X address counting section 36, the Y address counting section 37 and the like are connected to an internal data bus 43.

Figure 4:
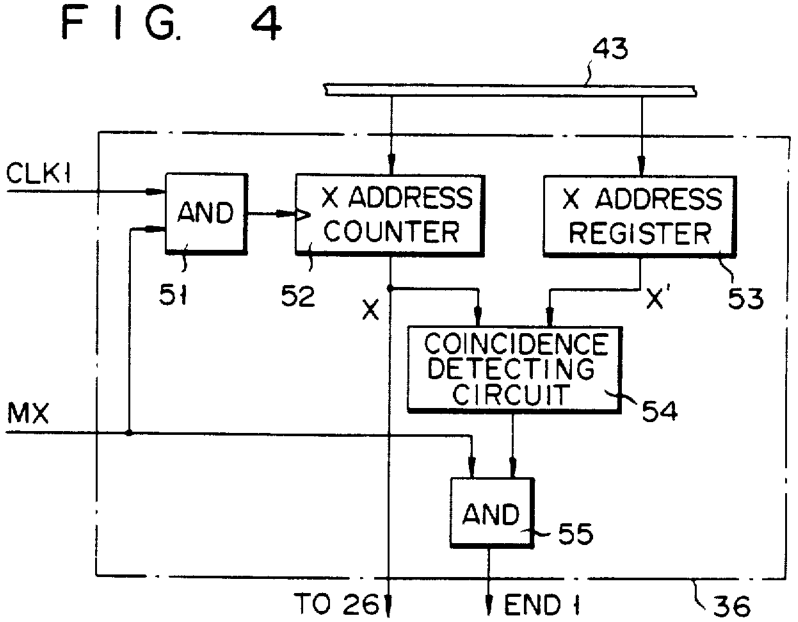
FIG. 4 is a block diagram showing the internal configuration of an X address counting section shown in FIG. 3.

FIG. 4 shows the configuration of the X address counting section 36. An AND gate 51 ANDs the signal CLK1 and the mode bit Mx. An X address counter 52 has its X address incremented in accordance with an output from the AND gate 51 and generates and X coordinate address for the GM 22. The X coordinate address at a start location of a designated source or destination area in the GM 22 is set as an initial preset value in the X address counter 52 by the μP 23 through the microprocessor bus 25, the data register 32, and the internal data bus 43. The X coordinate address at an end location of the source or destination address is set as an initial preset value in an X address register 53. A coincidence detecting circuit 54 detects a coincidence between an output address X from the X address counter 52 and an output address X' from the X address register 53. An AND gate 55 ANDs an output from the coincidence detecting circuit 54 and the mode bit Mx and produces the end signal END1.

Figure 5:
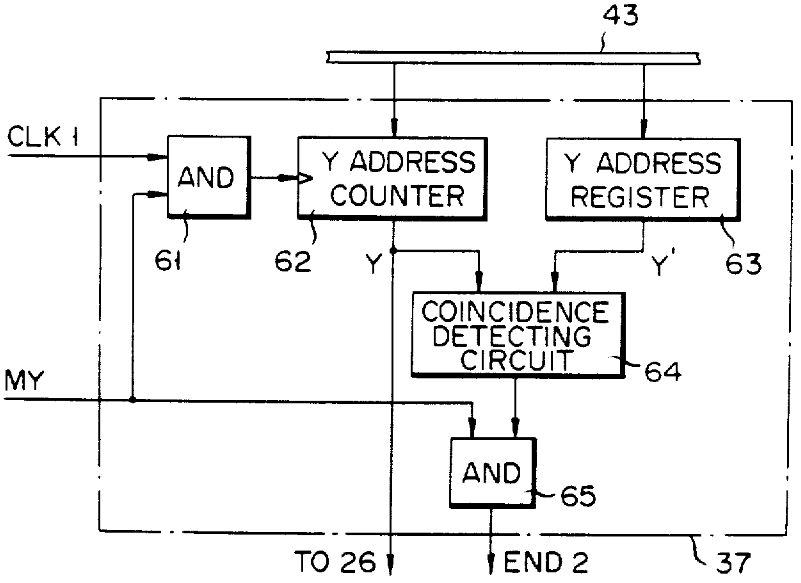
FIG. 5 is a block diagram showing the internal configuration of a Y address counting section shown in FIG. 3.

FIG. 5 shows the configuration of the Y address counting section 37. As can be seen from FIG. 5, the hardware of the Y address counting section 37 is basically the same as that shown in FIG. 5. Therefore, a description of the configuration of the circuit 37 shown in FIG. 5 will be omitted. When necessary, please follow the diagram shown in FIG. 5 replacing the reference numerals 51 through 55 with reference numerals 61 through 65, Mx with My, X with Y, X' with Y', and END1 with END2 in the description made with reference to FIG. 4.

The mode of operation of this embodiment of the present invention will now be described with reference to FIGS. 6A through 60 and FIGS. 7A through 70. As in the case of the conventional apparatus shown in FIG. 2, a description will be made with reference to a case of grapic memory interarea data tranfer (screen shift).

(1) Read Cycle (Graphic Data Transfer from GM22 to BM 41)

First, the μP 23 transfers a start X coordinate address XO and a start Y coordinate address YO for storing a graphic data string (to be transferred) in the GM 22 to the GCU 24 through the microprocessor bus 25. The addresses XO and YO are set as initial preset values in the X address counter 52 of the X address counting section 36 and in the Y address counter 62 of the Y address counting section 37, respectively, through the internal data bus 43. Subsequently, the μ23 transfers to the GCU 14 an end X coordinate address XO' and an end Y coordinate address YO'(=YO) of the graphic data string for storage in the GM 22. The addresses XO' and YO' (=YO) are respectively set in the X address register 53 of the X address counting section 36 and the Y address register 63 of the Y address counting section 37. The μP 23 also transfers the mode data to the GCU 24. The mode data is set in the mode register 53 through the data register 32 and the internal data bus 43. In this example wherein XO≠XO' and YO=YO', the mode bit Mx of the mode data is "1", while the mode bit My is "O".

Figures 6A, 6B, 6C, 6D, 6E, 6F, 6G, 6H, 6I, 6J, 6K, 6L, 6M, 6N, 6O:
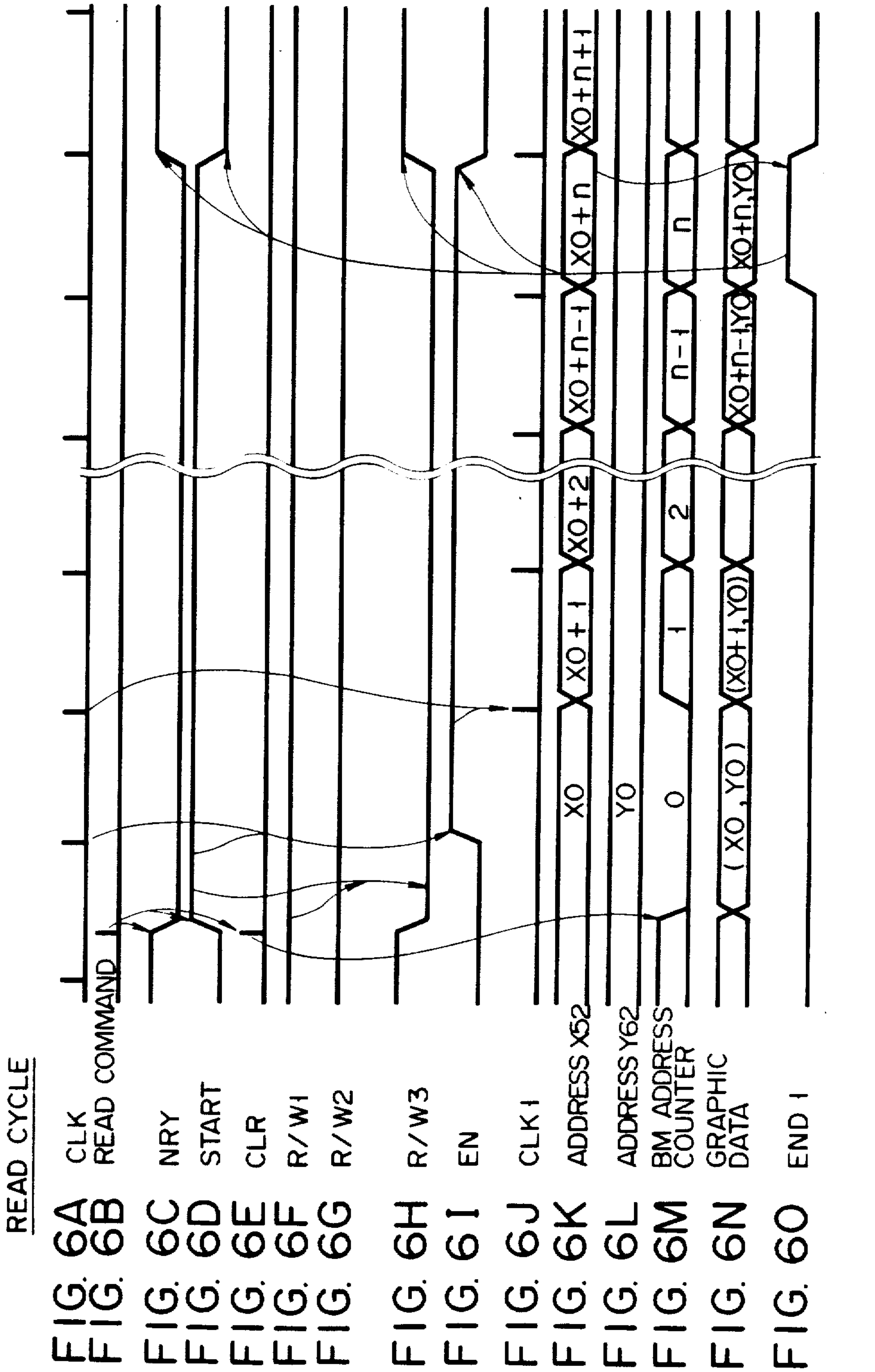

When the μP 23 completes the transfer operation of setting commands of the addresses XO, YO, XO' and YO' (=YO) and the mode data, it transfers a read command instructing a read of the graphic data string from the GM 22 to the GCU 24 through the microprocessor bus 25 at a timing shown in FIG. 6B. The read command is latched in the command register 31. At a timing shown in FIG. 6C, the I/O control circuit 33 turns on a not ready signal NRY, indicating the busy status, in response to the read command latched in the command register 31. The signal NRY is transferred to the μP 23 through the microprocessor bus 25. In response to the read command latched in the command register 31, the I/O decoder 34 produces the start signal START (FIG. 6D), the clear signal CLR (FIG. 6E), and the read/write signal R/W1 (FIG. 6E) instructing a read operation from the CM 22, which are all ON.

The BM address counter 42 is cleared by the clear signal CLR received from the I/O decoder 34. The address control circuit 39 is started by the start signal START from the I/O decoder 34. In response to the read/write signal R/W1 from the I/O decoder 34, the address control circuit 39 produces a read/write signal R/W2, instructing a data read from the GM 22, at a timing shown in FIG. 6G, and also produces a read/write R/W3, instructing data write in the Bm 41, at a timing shown in FIG. 6H. The address control circuit 39 also produces an enable signal EN, at a timing shown in FIG. 6I, for enabling the counting operation of the X and Y address counting sections 36 and 37, and a count-up signal UP for incrementing the BM address counter 42.

While the AND gate 40 receives the ON enable signal EN from the address control circuit 39, it gates the clock signal CLK (FIG. 6A), at a timing shown in FIG. 6J, as the clock signal CLK1 to the X and Y address counting sections 36 and 37. In response to the mode bit Mx of logic "1", the AND gate 51 in the X address counting section 36 gates the input clock signal CLK1 to the X address counter 52. Thus, the X address counter 52 is continuously incremented in the order of XO, XO+1, XO+2, . . . and so on, as shown in FIG. 6K. Meanwhile, in response in the mode bit My of logic "O", the AND gate 61 in the Y address counting section 37 inhibits the output of the clock signal CLK1 (FIG. 6J) to the Y address counter 62. Therefore, the output from the Y address counter 62, i.e., the Y coordinate address Y, is kept at the initial preset value YO, as shown in FIG. 61. The continuous outputs X from the X address counter 52, i.e., XO, XO+1, XO+2, . . . , and the continuous outputs Y from the Y address counter 62, i.e., YO, YO, YO, . . . , are transferred to the GM 22 through the GCU bus 26. The read/write signal R/W2 from the address control circuit 39 is transferred to the GM 22 through the GCU bus 26. Thus, the GM 22 is addressed by the linked information, and the graphic data at the locations corresponding to the coordinates (XO, YO), (XO+1, YO), (XO+2, YO), . . . on the screen of the CRT monitor 21 is sequentially read out from the GM 22. The readout data is transferred to the BM 41 through the GCU bus 26.

In response to the count-up signal UP from the address control circuit 39, the BM address counter 42 is continuously incremented in the order of 0, 1, 2, . . . in synchronism with the signal CLK1, as shown in FIG. 6M. The output from the BM address counter 42 is then supplied to the BM 41. As has been described earlier, the read/write signal R/W3 from the address control circuit 39 is supplied to the BM 41. Thus, the BM 41 is addressed by the output from the BM address counter 42 and, in synchronism with the clock CLK1 and at a timing as shown in FIG. 6N, sequentially stores from its start address the graphic data corresponding to the coordinate data (XO, YO), (XO+1, YO), (XO+2, YO), . . .

When the graphic data to be transferred from the GM 22 is sequentially written in the BM 41, assume that the output X from the X address counter 52 is detected by the coincidence detecting circuit 54 to coincide with the output XO' (=XO+n−1), i.e., the end X coordinate address of the transfer graphic data string in the GM 22. Then, the coincidence detecting circuit 54 supplies a coincidence detection signal to the AND gate 55. In response to both the coincidence detection signal from the coincidence detecting circuit 54 and the mode bit Mx of logic "1", the AND gate 55 produces the end signal END1 at a timing shown in FIG. 60. In response to the signal END1, the OR gate 38 supplies the end signal END to the address control circuit 39 and the I/O control circuit 33. Then, the address control circuit 39 stops generating the enable signal EN (FIG. 61), the count-up signal UP, the read/write signal R/W2 (FIG. 6C), and the read/write signal R/W3 (FIG. 6H). The I/O control circuit 33 turns off the not ready signal NRY at a timing as shown in FIG. 6C.

(2) Write Cycle (Graphic Data Transfer from BM 41 to GM 22)

When the μP 23 detects that the signal NRY has been turned off, the μP 23 performs the setting process of the mode data, an X start coordinate address X1 and a Y start coordinate address Y1 of a destination area in the GM 22, and an X end coordinate address X1' and a Y end coordinate address Y1' of the destination area in the GM 22 of the transfer graphic data string, in the same manner as described above. When the μP 23 completes the transference of setting commands of the addresses X1, Y1, X1' and Y1' (=Y1) and the mode data, it transfers a write command, designating that the transfer graphic data string be written in the GM 22, to the GCU 24 through the microprocessor bus 25 at a timing shown in FIG. 7B. The command is latched in the command register 31. In accordance with the write command latched in the command register 31, the I/O control circuit 33 turns on the not ready signal NRY, indicating the busy status, at a timing shown in FIG. 7C. In accordance with the write command latched in the command register 31, the I/O decoder 34 produces the start signal START (FIG. 7D), the clear signal CLR (FIG. 7E), and the read/write signal R/W1 (FIG. 7F) for instructing a data write in the GM 22, which are all ON.

Figure 1:
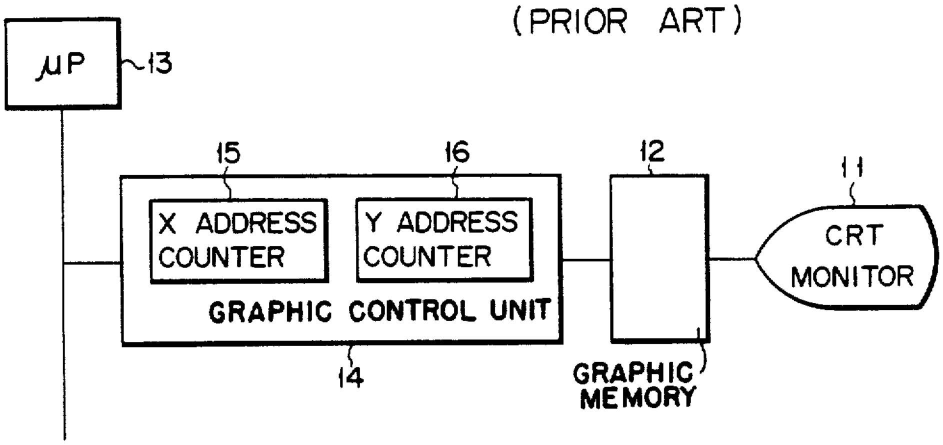
FIG. 1 (PRIOR ART)
FIG. 1 is a block diagram schematically showing the configuration of a conventional graphic display apparatus.
Figure 2:
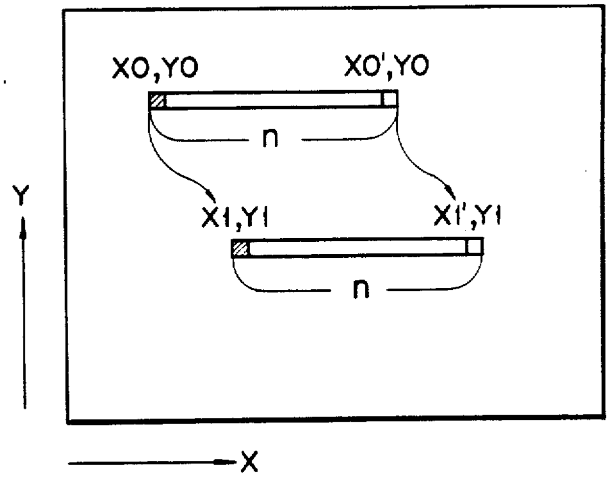
FIG. 2 (PRIOR ART)
FIG. 2 is a view for explaining an interarea copy in the graphic display apparatus shown in FIG. 1.
Figures 7A, 7B, 7C, 7D, 7E, 7F, 7G, 7H, 7I, 7J, 7K, 7L, 7M, 7N, 7O:
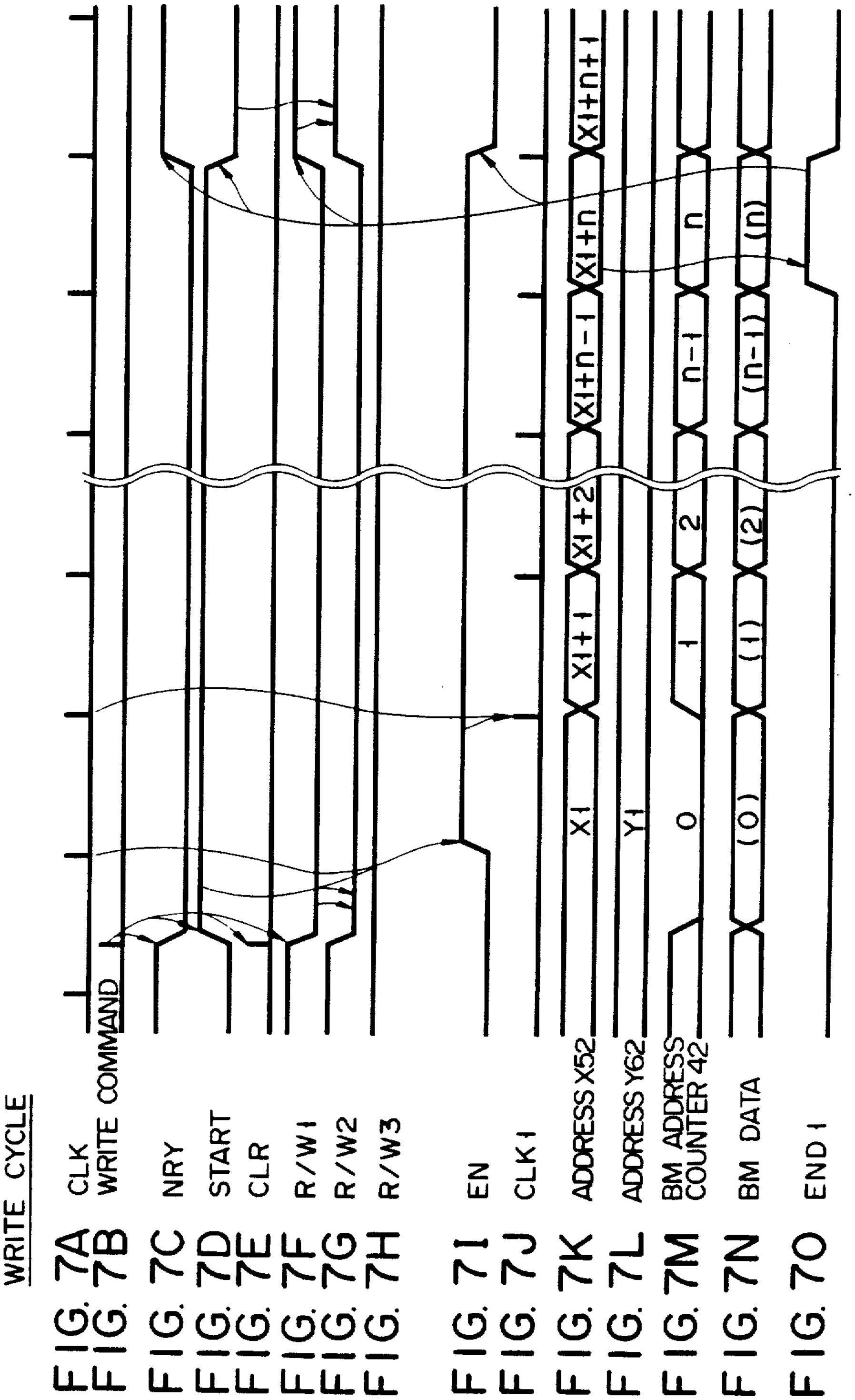

The BM address counter 42 is cleared in response to the clear signal CLR from the I/O decoder 34. The address control circuit 39 is started in response to the start signal START from the I/O decoder 34. The mode of operation of the address control circuit 39 at this time is the same as that performed upon receiving a read command except that the read/write signal R/W2, instructing a data write in the GM 22, is supplied thereto at a timing shown in FIG. 7G and the read/write signal R/W3, instructing a data read from the BM 41, is supplied thereto at a timing shown in FIG. 7H. Therefore, in case a write command is received, the BM 41 is addressed by the output (FIG. 7M) from the BM address counter 42. Thus, as shown in FIG. 7N, the transfer graphic data is sequentially read out from the start address of the accessed location in the BM 41, which has been stored therein in accordance with the read command. The graphic data sequentially read out from the BM 41 is sequentially transferred from the start data to the GM 22 through the GCU bus 26. The GM 22 is addressed by the continuous data consisting of the outputs X from the X address counter 52, i.e., X1, X1+1, X1+2, . . . as shown in FIG. 7K, and of the outputs Y from the Y address counter 62, i.e., Y1, Y1, Y1, . . . As a consequence, the graphic data string to be transferred is sequentially written from the start data at the respective address locations corresponding to the coordinates (X1, Y1), (Y1+1, Y1), (X1+2, Y1), . . . on the screen of the CRT monitor 21, as shown in FIG. 2.

Assume that the graphic data string, which has been temporarily stored in the RM 41, from the start data in the GM 22 and that the output X1' (=X1+n−1) from the X address counter 52 coincides with the end X coordinate address of the transfer destination area in the GM 22. Then, the coincidence detecting circuit 54 sends a coincidence detection signal to one input terminal of the AND gate 55. The mode signal Mx="1" is supplied to the other input terminal of the AND gate 55. The AND gate 55, therefore, produces an end signal END1, at a timing shown in FIG. 7O. The signal END1 is gated by the OR gate 38 which produces the end signal END. In response to the end signal END, the address control circuit 39 determines that a data transfer to the GM 22 has been completed and stops operating. Meanwhile, in response to the end signal END from the OR gate 38, the I/O control circuit 33 turns off the not ready signal NRY, as shown in FIG. 7C. When the μP 23 detects that the signal NRY has been turned off, it determines that the data transfer within the GM 22 has been completed.

In the above embodiment, a data transfer in the GM, required for data shift in the x (column) direction on the screen, has been described. However, data transfer in the GM, required for data shift in the Y (row) direction on the screen, can be similarly performed. In this case, mode data bits Mx="0" and My="1" are supplied to increment the Y address counter 62. Furthermore, in the above embodiment, an end of data transfer is detected by detecting a coincidence between the X (Y) address and the end X (Y) coordinate address. However, when a counter is included, a similar effect is obtained. In this case, the number of data to be transferred is set as an initial preset value in the counter. When it is detected that the output from the counter has become zero, an end of data transfer is detected.

What is claimed is

1. A graphic memory interarea data transfer system for a graphic display apparatus which has a graphic-memory for storing graphic data and which transfers graphic data at a source area in said graphic memory, designated by an apparatus of higher performance, to a destination area therein and displays the graphic data, comprising:

X coordinate address generating means responsive to an X start coordinate address, supplied from the apparatus of higher performance, for continuously generating X coordinate addresses of the source or destination area of said graphic memory and supplying the X coordinate addresses to said graphic memory;

Y coordinate address generating means responsive to a Y start coordinate address, supplied from the apparatus of higher performance, for continuously generating Y coordinate addresses of the source or destination area of said graphic memory and supplying the Y coordinate addresses to said graphic memory;

buffer memory means for temporarily storing continuous graphic data read out from said graphic memory;

buffer memory address generating means for supplying continuous read or write addresses to said buffer memory means;

first control means for reading out a plurality of coordinate graphic data from said graphic memory in a read cycle in accordance with the addresses of the source area supplied from said X and Y coordinate address generating means and for writing the readout graphic data in an address of said buffer memory means designated by said buffer memory address generating means; and second control means for reading out a plurality of coordinate graphic data in a write cycle following said read cycle from the address of said buffer memory means designated by said buffer memory address generating means and for writing the readout graphic data at the addresses of the destination area of said graphic memory supplied from said X and Y coordinate address generating means, wherein the same structures of said X and Y coordinate address generating means are employed to generate addresses for both said source area and said destination area.

2. A system according to claim 1, wherein each of said X and Y coordinate address generating means has:

a counter for incrementing the start address supplied from said apparatus of higher performance;

a register for holding the end address supplied from said apparatus of higher performance; and a coincidence detecting circuit for receiving an output from said counter and an output from said register and for producing a coincidence detection signal when the outputs from said counter and said register coincide with each other.

3. A system according to claim 1, further comprising a mode register in which is set, by said apparatus of higher performance, mode data which instructs continuous incrementing of the X coordinate address or the Y coordinate address.

4. A system according to claim 3, further comprising means, responsive to the mode data supplied from said mode register, for allowing a counting operation of said counter of one of said X and Y coordinate address generating means and for inhibiting a counting operation of said counter of the other of said X and Y coordinate address generating means.

5. A system according to claim 3, wherein said first control means stops a read operation from said graphic memory and a write operation in said buffer memory means in response to either: the coincidence detection signal from said coincidence circuit of said X address generating means when said mode data instructs continuous incrementing of the X coordinate address, or the coincidence detection signal from said coincidence circuit of said Y address generating means when said mode data instructs continuous incrementing of the Y coordinate address.

6. A system according to claim 3, wherein said second control means stops a read operation from said buffer memory means and a write operation in said graphic memory in response to either: the coincidence detection signal from said coincidence detection circuit of said X address generating means when said mode data instructs continuous incrementing of the X coordinate address, or the coincidence detection signal from said coincidence circuit of said Y address generating means when said mode data instructs continuous incrementing of the Y coordinate address.

7. A system according to claim 1, wherein said buffer memory address generating means comprises an address counter and an address control circuit for controlling said address counter.

8. A system according to claim 7, wherein said address counter of said buffer memory address generating means is reset in response to a clear signal from said apparatus of higher performance.

* * * * *